United States Patent [19]

Kadowaki et al.

[11] Patent Number: 4,728,684

[45] Date of Patent: Mar. 1, 1988

[54] POLYURETHANE ADHESIVE

[75] Inventors: Toshio Kadowaki, Amagasaki; Masahito Mori, Otokuni; Masaaki Soh, Ibaraki; Koichiro Sanji, Takatsuki, all of Japan

[73] Assignee: Sunstar Giken Kabushiki Kaisha, Takatsuki, Japan

[21] Appl. No.: 830,528

[22] PCT Filed: Apr. 25, 1985

[86] PCT No.: PCT/JP85/00233

§ 371 Date: Jan. 27, 1986

§ 102(e) Date: Jan. 27, 1986

[87] PCT Pub. No.: WO85/05628

PCT Pub. Date: Dec. 19, 1985

[30] Foreign Application Priority Data

May 30, 1984 [JP] Japan ................... 59-111648
May 31, 1984 [JP] Japan ................... 59-112574

[51] Int. Cl.$^4$ .................. C08L 51/08; C08L 75/06
[52] U.S. Cl. ........................ 524/271; 525/63; 525/66; 525/126; 525/127; 525/129; 525/130; 525/131; 524/273; 524/274
[58] Field of Search .............. 525/63, 131, 66, 127, 525/129; 524/271, 273

[56] References Cited

U.S. PATENT DOCUMENTS

| | | | |
|---|---|---|---|
| 3,337,481 | 8/1967 | Singelyn et al. | 525/129 |
| 3,914,484 | 9/1975 | Creegar et al. | 525/127 |
| 3,935,144 | 1/1976 | Hagenweiler et al. | 525/131 |
| 3,947,403 | 3/1976 | McCready | 525/129 |
| 4,035,440 | 7/1977 | Khanna et al. | 525/131 |
| 4,181,781 | 1/1980 | Chandolla et al. | 525/63 |
| 4,268,646 | 5/1981 | Agger et al. | 525/131 |
| 4,312,972 | 1/1982 | Khanna | 525/66 |
| 4,332,716 | 6/1982 | Shah | 525/129 |
| 4,439,587 | 3/1984 | Martinez et al. | 525/66 |
| 4,569,972 | 2/1986 | Legoe et al. | 525/131 |

FOREIGN PATENT DOCUMENTS

| | | | |
|---|---|---|---|
| 26660 | 7/1972 | Japan . | |
| 9479 | 3/1973 | Japan . | |
| 130927 | 12/1974 | Japan . | |
| 78077 | 6/1980 | Japan | 525/129 |
| 136867 | 10/1981 | Japan . | |
| 58-089673 | 5/1983 | Japan . | |
| 60-92375 | 2/1985 | Japan . | |
| 0466273 | 6/1975 | U.S.S.R. | 525/129 |
| 0718472 | 3/1980 | U.S.S.R. | 525/129 |

Primary Examiner—John C. Bleutge
Assistant Examiner—David W. Woodward
Attorney, Agent, or Firm—Wegner & Bretschneider

[57] ABSTRACT

A polyurethane adhesive comprising
(a) a thermoplastic polyester urethane rubber which is grafted with at least one of the compounds selected from the group consisting of acrylic acid, an acrylic ester, methacrylic acid and a methacrylic ester,
(b) a chlorinated rubber, and
(c) an isocyanate compound as a crosslinking agent, and optionally
(d) a polyoxyalkylene ether polyol having 2 or more ether groups in the molecule, and/or
(e) a rosin resin and/or a rosin resin derivative, which is an organic solvent solution type, and exhibits excellent adhesion particularly in case that at least one of the substances to be adhered is a soft polyvinyl chloride sheet or film.

4 Claims, No Drawings

POLYURETHANE ADHESIVE

FIELD OF THE INVENTION

The present invention relates to a polyurethane adhesive, more particularly an organic solution type polyurethane adhesive which exhibits particularly excellent adhesion where at least one of the substances to be adhered is a polyvinyl chloride sheet or film.

BACKGROUND OF THE INVENTION

Since a solution type polyurethane adhesive has excellent flexibility and excellent resistance to a plasticizer, it has hitherto been used as an all-round adhesive in various fields for adhering shaped products (e.g sheet and film) made from polyvinyl chloride which contain a large amount of a plasticizer with other plastic substances, wooden products or metallic products. However, it has still been desired to develop an improved adhesive having excellent heat resistance and improved performance and being capable of preventing lowering of adhesion which is induced by migration of the plasticizer from the substance to be adhered to the interface thereof. Moreover, the solvent solution type adhesive comprising a urethane rubber has less tack strength, and hence, for effecting the required adhesion, it is required to take such steps as applying the adhesive to both surfaces of the substances to be adhered, after taking some open time for drying the solvent, piling both surfaces against each other, pressing the piled substances, and further tacking temporarily by some means until adhesion by the adhesive is completed

OBJECT OF THE INVENTION

The present inventors have intensively studied on the development of an improved adhesive whose adhesion is less influenced by the plasticizer contained in the substances to be adhered, and it has been found that there can be obtained the desired polyurethane adhesive having excellent resistance against plasticizer by dissolving a thermoplastic polyester urethane rubber in an organic solvent, grafting a monomer suitable for preparing an acrylic resin to said rubber, and adding thereto a chlorinated rubber to obtain a main adhesive ingredient, and then combining the main adhesive ingredient with an isocyanate compound as a crosslinking agent. Then, the present invention has been completed. The present inventors have further found that by incorporating a specific polyoxyalkyl ether polyol to the above main adhesive ingredient, the adhesive shows highly improved heat aging resistance and heat creep resistance, and further that by incorporating a specific rosin resin or rosin resin derivative to the adhesive, it shows further improved initial adhesion to a plasticizer-containing soft polyvinyl chloride material, and owing to the tack strength, it can exhibit excellent adhesion without necessity of temporary tacking means, even less pressing of the substances coated by the adhesive, and further, even by applying the adhesive only to one of the substances to be adhered.

An object of the present invention is to provide a polyurethane adhesive which can exhibit excellent adhesive with heat aging resistance and heat resistance even in case of applying to substances to be adhered, at least one of which is a polyvinyl chloride sheet or film containing a large amount of a plasticizer. Another object of the invention is to provide a polyurethane adhesive having improved heat aging resistance and heat creep resistance. A further object of the invention is to provide a polyurethane adhesive having improved initial adhesion to a plasticizer-containing soft polyvinyl chloride substance.

SUMMARY OF THE INVENTION

The present invention relates to a polyurethane adhesive which comprises (a) a thermoplastic polyurethane rubber (hereinafter referred to as "urethane rubber") which is grafted with at least one of the compounds selected from the group consisting of acrylic acid, an acrylic ester, methacrylic acid and a methacrylic ester (hereinafter referred to as "graft rubber"), (b) a chlorinated rubber, and (c) an isocyanate compound as a crosslinking agent, and optionally (d) a polyoxyalkylene ether polyol containing two or more ether bonds within the molecule and/or (e) a rosin resin and/or a rosin resin derivative.

DETAILED DESCRIPTION OF THE INVENTION

The urethane rubber used as the component (a) in the present invention means an elastomer containing a urethane bond within the molecular chain and is a linear high molecular weight compound which is usually obtained by subjecting a polybasic acid (e.g. terephthalic acid, isophthalic acid, phthalic acid, succinic acid, adipic acid, azelaic acid, sebacic acid, etc.) and a divalent alcohol (e.g. ethylene glycol, 1,4-butanediol, 1,5-pentanediol, 1,6-hexanediol, diethylene glycol, triethylene glycol, polyethylene glycol, propylene glycol, etc.) to a condensation reaction, and reacting the resulting saturated polyester resin having a terminal hydroxyl group with a diisocyanate compound (e.g. tolylene diisocyanate, diphenylmethane diisocyanate, hexamethylene diisocyanate, xylylene diisocyanate, cyclohexylmethane diisocyanate, etc.), wherein the active hydrogen group of the resin and the isocyanate group of the isocyanate compound are reacted in an approximately equimolar amount. The urethane rubbers are easily dissolved in appropriate organic solvents, such as esters (e.g. ethyl acetate, butyl acetate, etc.), ketones (e.g. methyl ethyl ketone, cyclohexanone, acetone, etc.), aromatic solvents (e.g. toluene, xylene, benzene, etc.), chloro solvents (e.g. trichlene, methylene chloride, etc.) and the like.

The monomer for grafting to the above urethane rubber (hereinafter referred to as "graft monomer") includes acrylic acid, acrylic esters (e.g. methyl acrylate, ethyl acrylate, butyl acrylate, 2-ethylhexyl acrylate, isobutyl acrylate, 2-ethoxyethyl acrylate, glycidyl acrylate, tetrahydrofurfuryl acrylate, 2-hydroxyethyl acrylate, 2-hydroxypropyl acrylate, 1,4-butanediol diacrylate, 1,6-hexanediol diacrylate, pentaerythritol triacrylate, etc.), methacrylic acid, methacrylic esters (e.g. methyl methacrylate, ethyl methacrylate, butyl methacrylate, isobutyl methacrylate, t-butyl methacrylate, 2-ethylhexyl methacrylate, octyl methacrylate, isodecyl methacrylate, lauryl methacrylate, lauryl-tridecyl methacrylate, tridecyl methacrylate, cetylstearyl methacrylate, stearyl methacrylate, cyclohexyl methacrylate, benzyl methacrylate, 2-hydroxyethyl methacrylate, 2-hydroxypropyl methacrylate, dimethylaminoethyl methacrylate, diethylaminoethyl methacrylate, t-butylaminoethyl methacrylate, glycidyl methacrylate, tetrahydrofurfuryl methacrylate, etc.), and the like. At least one of them is used. Particularly preferred one is a compound having at least one functional group selected from hydroxy, cyano, glycidyl and amino groups. In addition to these monomers, there may be used together acrylamide, acrylonitrile, acrolein, vinyl acetate, styrene, N-methylolacrylamide, vinylpyridine, maleic anhydride, vinylpyrrolidone, butadiene, or the like.

The graft rubber used as the component (a) in the present invention can be prepared by grafting the urethane rubber with a graft monomer in a usual manner, for instance, by dissolving the above urethane rubber in an organic solvent, adding thereto a radical polymerization initiator (benzoyl peroxide, azobisisobutyronitrile, cumene hydroperoxide, t-butyl hydroperoxide, potassium persulfate, ammonium persulfate, etc.) and a graft monomer, heating the mixture with reflux at 60° to 100° C. for one hour or more, preferably for 2 to 4 hours, and thereby effecting the graft polymerization. In the grafting, the graft monomer is used in a ratio of 10 to 70 parts (weight parts, hereinafter, the same) to 100 parts of the urethane rubber, wherein preferably 10 to 30 parts of the graft monomer is consumed for the grafting. When the monomer to be grafted is in an amount of less than 10 parts, the resulting adhesive can not exhibit sufficient improvement in the adhesion, and on the other hand, when the amount of the monomer to be grafted is over 30 parts, the reaction solution increases in viscosity during the reaction and occasionally gels. The above polymerization initiator is usually used in an amount of 0.3 to 1.0 part to 100 parts of the urethane rubber. When the initiator is used in less amount, the reaction requires too high polymerization speed and too long polymerization period of time, and on the other hand, when the initiator is used in too larger amount, the reaction mixture shows increased viscosity and occasionally gelled, while the polymerizability is improved. The graft rubber thus obtained is used in a 5 to 30% solution in the above mentioned organic solvent.

The chlorinated rubber used as the component (b) in the present invention means the products obtained by chlorinating a natural rubber or a synthetic rubber, and includes, for example, chlorinated natural rubbers, such as Adeka chlorinated rubber CR-5, CR-10, CR-20, CR-40, CR-90 and CR-150 (manufactured by Asahi Denka Kogyo, K.K.), and chlorinated synthetic rubbers, such as chlorinated polyethylene and chlorinated polypropylene which are prepared by chlorinating polyethylene and polypropylene, chlorinated polyvinyl chloride obtained from polyvinyl chloride and chlorinated polyethylene, and the like. These chlorinated rubbers are dissolved well in organic solvents, such as aromatic solvents, esters, and ketones. The chlorinated rubbers are used in an amount of 0.5 to 20 parts to 100 parts of the component (a): graft rubber. Even when the chlorinated rubber is incorporated into a urethane rubber which is not grafted, it does not show any effect, but when it is incorporated into the graft rubber as used in the present invention, it effects significantly on prevention of the undesirable migration of the plasticizer in the substances to be adhered to the adhesion interface and then improvement of the heat adhesion, while the reason thereof is not clear.

The crosslinking agent used as the component (c) in the present invention may be any isocyanate compounds which have usually been used as a crosslinking agent for adhesives in the form of a chloroprene solution and for urethane rubber adhesives, provided that they should have a high vapor pressure and less toxicity to human body and be easily handled. Examples thereof are triphenylmethane triisocyanate (e.g. Desmodur R, manufactured by Bayer, which is in the form of 20% solution in methylene chloride), triisocyanate phenylthiophosphate (e.g. Desmodur RF, manufactured by Bayer, which is in the form of 20% solution in methylene chloride), an isocyanate compound prepared by adding trimethylolpropane to tolylene diisocyanate (e.g. Colonate L, manufactured by Nippon Polyurethane K.K., which is in the form of 75% solution in acetic acid), MDI of a specific grade (e.g. Millionate MR, manufactured by Nippon Polyurethane K.K.), and the like. These isocyanate compounds are effective on the improvement of adhesion, because the isocyante group of the compound reacts with the active hydrogen group in the hydroxy group contained in the molecular chain of the component (a): graft rubber. The isocyanate compounds are used in an amount of 3 to 50 parts (as a solid) to 100 parts of the component (a): graft rubber.

The polyoxyalkylene ether polyol containing two or more ether bonds in the molecule used as the component (d) in the present invention includes a random or block copolymer: polyoxyethylene-propylene polyol which is prepared by subjecting propylene oxide and ethylene oxide to ring opening polymerization in the presence of one or more low molecular weight active hydrogen compounds having two or more active hydrogen (e.g. diols such as ethylene glycol, propylene glycol, butylene glycol, 1,6-hexanediol, etc.: triols such as glycerin, trimethylolpropane, 1,2,6-hexanetriol, etc.; and amines such as ammonia, methylamine, ethylamine, propylamine, butylamine, etc.), a polyoxytetramethylene glycol which is prepared by ring opening polymerization of tetrahydrofuran. The preferred compounds have a molecular weight of 5,000 to 10,000 and have 2 to 3 hydroxy groups in one molecule. The polyoxyalkylene ether polyol is usually used in an amount of 5 to 20 parts, preferably 8 to 15 parts, to 100 parts of the component (a). The adhesive incorporated with this component (d) is well compatible with the plasticizers etc. contained in the soft polyvinyl chloride sheet and shows improved adhesion.

The rosin resin or rosin resin derivative used as the component (e) in the present invention includes, for example, pentaerythritol ester or glycerol ester of rosin resin; hydrogenated rosin resin; methyl ester, triethylene glycol ester, pentaerythritol ester or rosin ester of hydrogenated rosin resin; polymerized rosin resin; glycerol ester of polymerized rosin resin; and the like. Particularly preferred one is hydrogenated rosin resin and derivatives of hydrogenated rosin resin. These are usually used in an amount of 3 to 20 parts, preferably 5 to 10 parts, to 100 parts of the component (a).

The polyurethane adhesive of the present invention is usually practically used in the form of a two-pack organic solvent solution comprising a main adhesive ingredient comprising the above components (a) and (b) and optionally the component (d) or (e), and a crosslinking agent consisting of the component (c). It is useful not only for adhesion of a shaped product of a polyvinyl chloride sheet or film containing a large amount of a plasticizer as one of the substances to be adhered with a plastic substance, wooden product or metallic product, but also as an adhesive for lamination processing of plastic films which is the main utility of conventional polyurethane adhesives. Moreover, in case that the component (e) is incorporated, the adhesive of the present invention can exhibit the desired adhesion merely by applying it to the surface of either one of the substances to be adhered (single spreading), after having an open time, piling up onto the face of another substance to be adhered, and pressing lightly the piled substances, by which the adhesion can be done without necessity of temporary tacking by other means, owing to the tacking properties of the component (e).

The present invention is illustrated by the following Examples and Reference Examples.

EXAMPLES 1-5

A urethane rubber (Pandex T5205, manufactured by Dainippon Ink Kagaku Kogyo K.K.), a graft monomer (MMA: methyl methacrylate, EA: ethyl acrylate, 2-HEMA: 2-hydroxyethyl methacrylate, GA: glycidyl acrylate, AN: acrylonitrile), an organic solvent (MEK: methyl ethyl ketone) and a polymerization initiator (BPO: benzoyl peroxide) are previously taken in a glass-made vessel in a precise amount as shown in Table 1, and the mixture is reacted with reflux at 80° C. for 3 hours, and in the resulting solution is dissolved a chlorinated rubber to give a main adhesive ingredient. To 100 parts of the main adhesive ingredient is incorporated 20 parts of a crosslinking agent (Desmodur R) to prepare a polyurethane adhesive.

REFERENCE EXAMPLE 1

In the same manner as in Examples 1-5 except that no graft monomer is used and hence urethane rubber which is not grafted is used, there is prepared a polyurethane adhesive.

REFERENCE EXAMPLE 2

In the same manner as in Example 1 except that no chlorinated rubber is added, there is prepared a polyurethane adhesive.

Test 1

Each adhesive of Examples 1-5 and Reference Examples 1-2 was applied in an amount of about 100 g/m² to a leather product of polyvinyl chloride sheet (Olsia, manufactured by Sunstar Giken) and to an ABS resin plate which was prepared by cutting an ABS resin (Kane Ace, manufactured by Kanegafuchi Chemical) in the form of a strip in a size of 20 mm width×100 mm length. Both were dried and then piled up to give a test sample for testing adhesion. The test sample was aged and cured for one day, and thereafter, there were measured 180° peel strength and also peel strength under heating atmosphere at 110° C. with an autograph. Moreover, under such a heating atmosphere, a load of 10 g was applied to one end of the sheet, and then the sample was subjected to a creep test for 24 hours, wherein the length of peeling was measured. The results are shown in Table 1.

TABLE 1

|  | Examples | | | | | Ref. Exs. | |
| --- | --- | --- | --- | --- | --- | --- | --- |
|  | 1 | 2 | 3 | 4 | 5 | 1 | 2 |
| Urethane rubber | 100 | 100 | 100 | 100 | 100 | 100 | 100 |
| Graft monomer: | | | | | | | |
| MMA | 20 | — | — | 20 | 20 | — | 20 |
| EA | — | 20 | — | — | — | — | — |
| BMA | — | — | 20 | — | — | — | — |
| 2-HEMA | — | — | — | 5 | — | — | — |
| GA | — | — | — | — | 5 | — | — |
| AN | 4 | 4 | 4 | 4 | 4 | — | 4 |
| MEK | 496 | 496 | 496 | 516 | 516 | 400 | 496 |
| BPO | 0.5 | 0.5 | 0.5 | 0.5 | 0.5 | — | 0.5 |
| Chlorinated rubber | 5 | — | 5 | 5 | 5 | 5 | 5 |
| 180° peel strength (kg/in) | 12.0 | 11.5 | 12.5 | 12.0 | 12.3 | 7.0 | 8.5 |
| Peel strength after heat aging (kg/in) | 12.5 | 12.0 | 12.5 | 12.5 | 12.7 | 6.5 | 8.5 |
| Creep resistance under heating [peel length: 60 mm] | 0 mm | 1 mm | 2 mm | 0 mm | 0 mm | Fall after 4 hr. | Fall after 6 hr. |

As is clear from Table 1, in the creep test under heating, the plasticizer from the polyvinyl chloride product as the substance to be adhered would give much effect on the lowering of adhesion, but the adhesives of Examples of the present invention showed significant improvement in comparison with the adhesives of Reference Examples.

EXAMPLES 6-9

An ungrafted urethane rubber (Pandex T5205, manufactured by Dainippon Ink Kagaku Kogyo K.K.) or Desmocol 450 (manufactured by Bayer), a graft monomer (MMA: methyl methacrylate, EA: ethyl acrylate, BMA: butyl methacrylate, 2-HEMA: 2-hydroxyethyl methacrylate, AN: acrylonitrile), an organic solvent (MEK: methyl ethyl ketone) and a polymerization initiator (BPO: benzoyl peroxide) are previously taken in a glass-made vessel in a precise amount, and the mixture is reacted with reflux at 80° C. for 3 hours, and in the resulting graft rubber solution are dissolved a chlorinated rubber and a polyoxyalkylene ether polyol (manufatured by Mitsui Nisso Urethane) to give a main adhesive ingredient (the amount of each component is shown in Table 2). To 100 parts of the main adhesive ingredient is incorporated 20 parts of a crosslinking agent (Desmodur R) to prepare a polyurethane adhesive.

REFERENCE EXAMPLE 3

In the same manner as in Examples 6-9 except that only an ungrafted urethane rubber and solvent are used, there is prepared a polyurethane adhesive.

TABLE 2

|  | Examples | | | | Ref. Ex. |
| --- | --- | --- | --- | --- | --- |
|  | 6 | 7 | 8 | 9 | 3 |
| Pandex T5205 | 100 | — | 100 | 100 | 100 |
| Desmocol 450 | — | 100 | — | — | — |
| MMA | 20 | 20 | 20 | — | — |
| EA | — | — | — | 20 | — |
| BMA | — | — | — | 20 | — |
| 2-HEMA | — | — | 5 | — | — |
| AN | 4 | 4 | 4 | 4 | — |
| MEK | 496 | 496 | 516 | 496 | 496 |
| BPO | 0.5 | 0.5 | 0.5 | 0.5 | — |
| Chlorinated rubber | 5 | 5 | 5 | 5 | — |
| Polyalkylene ether diol (MW: 1000) | — | 10 | 10 | 10 | — |

TABLE 2-continued

|  | Examples | | | | Ref. Ex. |
|---|---|---|---|---|---|
|  | 6 | 7 | 8 | 9 | 3 |
| Polyalkylene ether triol (MW: 3000) | 10 | — | — | — | — |

Test 2

In the same manner as in Test 1 except that the adhesives of Examples 6-9 of Reference Examples 3 were used, there were measured 180° peel strength, peel strength after heat aging and also creep resistance under heating. The results are shown in Table 3.

TABLE 3

|  | Examples | | | | Ref. Ex. |
|---|---|---|---|---|---|
|  | 6 | 7 | 8 | 9 | 3 |
| 180° peel strength (kg/in) | 11.5 MF | 12.0 MF | 11.0 MF | 11.2 MF | 8.5 AF |
| Peel strength after heat aging (kg/in) | 6.8 AF | 6.7 AF | 6.5 AF | 6.0 AF | 1.2 AF |
| Creep resistance under heating [peel length: 60 mm] | 1.0 mm | 0 mm | 0 mm | 1.0 mm | Fall after 4 hr. |

EXAMPLES 10-12

An ungrafted urethane rubber (Pandex T5205, manufactured by Dainippon Ink Kagaku Kogyo K.K.), a graft monomer (MMA: methyl methacrylate, EA: ethyl acrylate, 2-HEMA: 2-hydroxyethyl methacrylate, AN: acrylonitrile), an organic solvent (MEK) and a polymerization initiator (BPO: benzoyl peroxide) are previously taken in a glass-made vessel in a precise amount, and the mixture is reacted with reflux at 80° C. for 3 hours, and in the resulting graft rubber solution are dissolved a chlorinated rubber and a rosin resin (Foral A, manufactured by Hercules; Ester Gum A, manufactured by Arakawa Kagaku Kogyo; Super Ester A 100, manufactured by the same company; or Hariester 80P, manufactured by Harima Kasei Kogyo) to give a main adhesive ingredient (each amount of the components is shown in Table 4). To 100 parts of the main adhesive ingredient is incorporated 20 parts of a crosslinking agent (Desmodur R) to prepare a polyurethane adhesive.

Test 3

In the same manner as in Test 1 except that the adhesives of Examples 10-12 or Reference Example 3 were used, there were measured 180° peel strength, peel strength after heat aging and also creep resistance under heating. The results are shown in Table 4.

TABLE 4

|  | Examples | | | Ref. Ex. |
|---|---|---|---|---|
|  | 10 | 11 | 12 | 3 |
| Pandex T5205 | 100 | 100 | 100 | 100 |
| MMA | 20 | 20 | 20 | — |
| EA | — | — | 20 | — |
| 2-HEMA | — | 5 | — | — |
| AN | 4 | 4 | 4 | — |
| MEK | 496 | 496 | 496 | 496 |
| BPO | 0.5 | 0.5 | 0.5 | — |
| Chlorinated rubber | 5 | 5 | 5 | — |
| Foral A | — | — | 7 | — |
| Super Ester A100 | 7 | — | — | — |
| Hariester 80P | — | 7 | — | — |
| 180° peel strength (kg/in) | 11.8 MF | 12.0 MF | 11.5 MF | 8.0 AF |
| Peel strength after heat aging (kg/in) | 6.7 AF | 7.2 Af | 6.8 AF | 1.2 AF |
| Creep resistance under heating [peel length: 60 mm] | 1.0 mm | 1.5 mm | 1.0 mm | Fall after 4 hr. |

We claim:
1. A polyurethan adhesive comprising:
 (a) 100 parts by weight of a thermoplastic polyester urethane rubber which is grafted with 10 to 70 parts by weight to 100 parts by weight of the urethane rubber of at least one of the compounds selected from the group consisting of acrylic acid, an acrylic ester, methacrylic acid and a methacrylic ester,
 (b) 0.5 to 20 parts by weight of a chlorinated rubber to 100 parts by weight of component (a),
 (c) 3 to 50 parts by weight of an isocyanate compound selected from the group consisting of triphenylmethane triisocyanate, triisocyanate phenylthiophosphate, an isocyanate compound prepared by adding trimethylolpropane to tolylene diisocyanate, and diphenylmethane diisocyanate, to 100 parts by weight of compound (a), and
 (d) a polyoxyalkylene ether polyol having 2 or more ether groups in the molecule in an amount of 5 to 20 parts by weight to 100 parts by weight of the compound (a), in the form of a solution in an organic solvent.
2. The polurethane adhesive according to claim 1, wherein the acrylic ester or methacrylic ester contains at least one functional group selected from the group consisting of hydroxy group, cyano group, glycidyl group and amino group.
3. The polyurethane adhesive according to claim 1, wherein (e) at least one member selected from the group consisting of a rosin resin and a rosin resin derivative is further incorporated in an amount of 3 to 20 parts by weight to 100 parts by weight of the component (a).
4. The polyurethane adhesive according to claim 1, wherein the polyoxyalkylene ether polyol has a molecular weight of 5,000 to 10,000.

* * * * *